US009774793B2

(12) United States Patent
Price (10) Patent No.: US 9,774,793 B2
(45) Date of Patent: Sep. 26, 2017

(54) IMAGE SEGMENTATION FOR A LIVE CAMERA FEED

(71) Applicant: Adobe Systems Incorporated, San Jose, CA (US)

(72) Inventor: Brian Price, San Jose, CA (US)

(73) Assignee: ADOBE Systems Incorporated, San Jose, CA (US)

( * ) Notice: Subject to any disclaimer, the term of this patent is extended or adjusted under 35 U.S.C. 154(b) by 0 days.

(21) Appl. No.: 14/449,351

(22) Filed: Aug. 1, 2014

(65) Prior Publication Data

US 2016/0037087 A1 Feb. 4, 2016

(51) Int. Cl.
| | |
|---|---|
| *G06K 9/34* | (2006.01) |
| *H04N 5/272* | (2006.01) |
| *H04N 5/222* | (2006.01) |
| *G06T 7/11* | (2017.01) |
| *G06T 7/162* | (2017.01) |
| *G06T 7/194* | (2017.01) |

(52) U.S. Cl.
CPC ............... *H04N 5/272* (2013.01); *G06T 7/11* (2017.01); *G06T 7/162* (2017.01); *G06T 7/194* (2017.01); *H04N 5/2226* (2013.01); *G06T 2207/10016* (2013.01)

(58) Field of Classification Search
None
See application file for complete search history.

(56) References Cited

U.S. PATENT DOCUMENTS

| | | | | |
|---|---|---|---|---|
| 2004/0042662 A1* | 3/2004 | Wilensky | ............... | G06K 9/342 382/194 |
| 2007/0165949 A1* | 7/2007 | Sinop | ............... | G06K 9/342 382/173 |
| 2007/0237393 A1* | 10/2007 | Zhang | ............... | G06K 9/38 382/173 |

(Continued)

FOREIGN PATENT DOCUMENTS

| | | |
|---|---|---|
| GB | 2467804 A | 8/2010 |
| WO | 2013003026 A2 | 1/2013 |

OTHER PUBLICATIONS

Gastal and Oliveira, Siemens Corporate Research, "Shared Sampling for Real-Time Alpha Matting", The Eurographics Association and Blackwell Publishing Ltd., 2010, vol. 29(2010), No. 2, 10 pgs.

(Continued)

*Primary Examiner* — Brian Yenke
*Assistant Examiner* — Humam Satti
(74) *Attorney, Agent, or Firm* — Finch & Maloney PLLC (57) ABSTRACT

Techniques are disclosed for segmenting an image frame of a live camera feed. A biasing scheme can be used to initially localize pixels within the image that are likely to contain the object being segmented. An optimization algorithm for an energy optimization function, such as a graph cut algorithm, can be used with a non-localized neighborhood graph structure and the initial location bias for localizing pixels in the image frame representing the object. Subsequently, a matting algorithm can be used to define a pixel mask surrounding at least a portion of the object boundary. The bias and the pixel mask can be continuously updated and refined as the image frame changes with the live camera feed.

17 Claims, 5 Drawing Sheets

(56) References Cited

U.S. PATENT DOCUMENTS

| | | | |
|---|---|---|---|
| 2009/0041344 A1* | 2/2009 | Campbell | G06K 9/00456 382/164 |
| 2009/0316988 A1* | 12/2009 | Xu | G06K 9/6256 382/173 |
| 2010/0128984 A1* | 5/2010 | Lempitsky | G06K 9/6224 382/180 |
| 2011/0038536 A1* | 2/2011 | Gong | G06T 7/0081 382/164 |
| 2011/0075921 A1* | 3/2011 | Sun | G06T 11/001 382/164 |
| 2011/0249190 A1* | 10/2011 | Nguyen | H04N 5/272 348/708 |
| 2011/0274352 A1 | 11/2011 | Blake et al. | |
| 2013/0114942 A1 | 5/2013 | Yu et al. | |
| 2013/0243313 A1* | 9/2013 | Civit | G06T 5/002 382/164 |
| 2013/0336582 A1* | 12/2013 | Dai | G06K 9/4652 382/165 |
| 2014/0028794 A1* | 1/2014 | Wu | H04N 13/004 348/43 |
| 2014/0072212 A1* | 3/2014 | Sorgi | G06T 7/0081 382/164 |
| 2014/0254863 A1* | 9/2014 | Marks | G06K 9/00771 382/103 |
| 2015/0055849 A1 | 2/2015 | Galavis et al. | |
| 2015/0110391 A1* | 4/2015 | Zhou | G06T 7/0097 382/164 |
| 2015/0187076 A1* | 7/2015 | Lin | H04N 7/15 382/103 |
| 2015/0189146 A1* | 7/2015 | Venshtain | H04N 5/2352 382/103 |
| 2015/0193937 A1* | 7/2015 | Georgiev | G06T 7/0055 382/168 |
| 2015/0339828 A1* | 11/2015 | Djelouah | G06T 7/0087 382/173 |

OTHER PUBLICATIONS

Boykov and Jolly, "Interactive Graph Cuts for Optimal Boundary & Region Segmentation of Objects in N-D Images", Proceedings of Internation Conference on Computer Vision, Vancouver, Canada, Jul. 2001, vol. I, p. 105, 8 pgs.

Tang et al., University of Western Ontario Canada, "GrabCut in One Cut", Proceedings of "International Conference on Computer Vision" (ICCV), Sydney, Australia, Dec. 2013, 8 pgs.

Tomasi and Kanade, "Shape and Motion from Image Streams: a Factorization Method—Part 3, Detection and Tracking of Point Features, Technical Report CMU-CS-91-132", Apr. 1991, 22 pgs.

GB Patent Search Report for related application No. GB1513009.9, mailed on Nov. 25, 2015, 11 pages.

* cited by examiner

FIG. 4

IMAGE SEGMENTATION FOR A LIVE CAMERA FEED

FIELD OF THE DISCLOSURE

This disclosure relates to the field of data processing, and more particularly, to techniques for segmenting an image frame of a live camera feed.

BACKGROUND

In image editing applications, various segmentation techniques can be used to delineate one or more objects in an image with respect to other objects or the background. Some of these techniques require a previously taken image, from which the object is manually selected.

BRIEF DESCRIPTION OF THE DRAWINGS

The accompanying drawings are not intended to be drawn to scale. In the drawings, each identical or nearly identical component that is illustrated in various figures is represented by a like numeral.

DETAILED DESCRIPTION

Image segmentation refers to a class of operations in which an image is partitioned into two or more segments, typically for locating objects and boundaries. More particularly, image segmentation includes assigning one or more labels to each pixel in the image. For instance, one segment may include pixels representing an object in the foreground of an image, and another segment may include pixels representing the background. In some prior image segmentation techniques, a user imposes certain hard constraints for segmentation by designating certain pixels in the image that have to be part of the object and certain pixels that have to be part of the background. These hard constraints provide clues on how the user intends to segment the image. The remaining pixels are labeled as belonging to the object or the background by automatically computing a global optimum among all potential segments satisfying the user-designated hard constraints, thereby segmenting the image into at least two regions (e.g., one segment including the object and one segment including the background). However, such prior techniques require user intervention for imposing the hard constraints used for performing the segmentation.

To this end, and in accordance with an embodiment of the present invention, techniques are disclosed for segmenting an image frame of a live camera feed. While numerous applications for such segmenting will be apparent in light of this disclosure, one example application is in the context of creating masks for objects in an editing tool (e.g., a software application, such as Adobe Photoshop®). For example, to select an object, a user may simply point a smartphone camera at that object and a selection is automatically made by an image segmentation module executable on that smartphone, in accordance with an embodiment. In some embodiments, the selected object may be tinted with a suitable color or textured or outlined or otherwise accentuated. As the camera is moved, the camera feed is shown to the user and the object is automatically selected and reselected for each new camera position. This method of interaction with the target object differs from typical selection techniques that require the photograph to first be taken and then the object is manually selected by the user. In accordance with an embodiment of the present invention, the object is selected before the photograph is taken. So, if the object is not selected correctly, the user can move the camera and/or the object in effort to get a better selection. When the selection is correct or otherwise approved, the user can take the photograph and the corresponding mask associated with that selection can be saved. The interaction can be implemented, for example, via an executable module (e.g., software or firmware) executing on the computing device operatively coupled with the camera. In one particular example embodiment, a biasing scheme is used to initially localize pixels within the image that are likely to contain a target object being segmented. Then, the initial location bias can be used in conjunction with an optimization algorithm for selecting pixels in the image frame representing the object, thereby segmenting the image. Subsequently, a matting algorithm can be used to define a pixel mask surrounding or within the object boundary. The bias and the pixel mask can be continuously updated and refined as the image frame changes with the live camera feed. Numerous configurations and variations will be apparent in light of this disclosure.

As used in this disclosure, the terms "segmenting" and "image segmentation" include a process of logically partitioning a digital image into multiple segments or sets of pixels. Each segment can include any number of pixels (e.g., one or more), and there can be any number of segments produced by the segmenting process. Segmentation of an image does not necessarily modify the image; however, the segments can be displayed in any number of formats to provide a visualization of those segments to a human observer (e.g., by outlining or highlighting each segment, or obscuring certain segments from view). Further, segments can be used for other purposes, such as object selection within an image editing application. Other examples will be apparent in light of this disclosure.

An objective function can be created to represent an image processing problem, including segmentation. The objective function can be solved using an algorithm, such as a graph cut optimization algorithm or a belief propagation algorithm. Graph cut is a method for dividing a graph into two using a min-cut or max-flow algorithm. In one implementation of a graph cut image object selection method, to interactively select an object, the user drags the mouse over the image to draw foreground strokes or background strokes. The strokes themselves may or may not be shown on the screen. If the user draws a foreground stroke, it means that all pixels under the foreground stroke must be part of the foreground. All pixels under a background stroke must be part of the background. The user indicates whether a stroke is foreground or background, and can do this by clicking a button, holding a key on the keyboard, using a different mouse button for foreground and background, or another suitable input. For all pixels that are not covered by a stroke, the graph cut algorithm assigns those pixels to either the foreground or the background. When doing this, the graph cut tries to ensure that the boundary of the foreground lies on edges in the image.

Graph cut algorithms solve for a selection by minimizing the following objective function:

$$\sum_{x_i \in X} R(x_i) + \lambda \sum_{(x_i, x_j) \in N(X)} B(x_i, x_j)|x_i - x_j|$$

X is the set of pixel labels $x_i$ where $x_i=0$ indicates that the pixel i is part of the background and $x_i=1$ indicates that pixel i is part of the object. N(X) is the set of all pairs of labels corresponding to pixels that are neighboring in the image. The scalar $\lambda$ trades off the relative importance of the functions R and B.

The function R is a region term that gives a cost for a given pixel i having the label $x_i$. R is often determined by the user strokes. In some formulations, the costs set by R only apply to pixels under the user strokes. In such cases, if a user draws a foreground stroke over pixel i, then R $(x_i)$=0 for $x_i$=1 and R $(x_i)$=∞ for $x_i$=0. If the user draws a background stroke over pixel i, R$(x_i)$=0 for $x_i$=0 and R$(x_i)$=∞ for $x_i$=1. For all pixels that are not covered by a user stroke, R $(x_i)$=0. In other implementations of graph cut segmentation, the term R will be defined using a foreground color model computed with all pixels under the foreground stroke and a background color model from all pixels under a background stroke.

B is a function that encourages the selection boundary to follow image edges. It is often a function of the gradient in the image. For example, B may be defined as:

$$B(x_i, x_j) = e^{-\frac{(c_i - c_j)^2}{2\sigma^2}}$$

where $C_i$ is the color of pixel i. The energy function can be minimized exactly using the min-cut or the max-flow algorithm.

According to an embodiment of the present invention, an objective function can be defined for use in interactive selection methods to allow for a non-local, feature-based neighborhood that can be directly biased toward the foreground or background. The R term can be defined to apply a general bias instead of user-stroke-based constraints.

$$E(X, Y) = \sum_{x_i \in X} R(x_i) + \lambda \sum_{(x_i, x_j) \in N(X)} B(x_i, x_j)|x_i - x_j| + $$
$$\lambda_1 \sum_{y_i \in Y} R_f(y_i) + \lambda_2 \sum_{(y_i, y_j) \in N(Y)} B_f(y_i, y_j) + \lambda_3 \sum_{(x_i, y_j) \in N(X,Y)} B_{fp}(x_i, y_j)$$

The objective function is optimized over the set of all pixel labels X and a set of labels that represent features clusters Y. For example, each red-green-blue (RGB) color may include a cluster i that has a label $y_i$ in Y. In regular RGB space, each color channel typically has 256 values, and thus there are a total of $256^3$ clusters. However, according to an embodiment of the present invention, a quantized RGB color space can be used. Thus, by contrast, in the quantized RGB color space, colors are grouped so that each color channel only has, for example, 64 colors (or sixteen colors, 128 colors, or any other number of colors). Therefore, quantized RGB color space has fewer total clusters than regular RGB space. Other features (e.g., L*a*b color space, scale-invariant feature transform or SIFT) or clustering algorithms can be used.

Each feature cluster i (with label $y_i$ in Y) can be associated with all the pixels that have a particular feature. Using RGB colors, each feature cluster i represents a color and each pixel j with that color is linked to the cluster in the objective function, where N(X, Y) defines which pixels are associated with which features. A cost is assigned to any pixel having a different label than the feature associated with the pixel. Each features cluster also has a region term $R_f$ similar to the region term R that directly biases that cluster toward the foreground or background. Additionally, a boundary term $B_f$ links adjacent features together (e.g., if two pixels are right next to each other in the color space, meaning they are very similar, then these pixels are encouraged to both have the same label). Each $\lambda$ is a weighting on the corresponding term. R is defined based on the foreground bias, as described in this disclosure. The B term is, in some embodiments, defined as in the graph cut methods. Both $B_f$ and $B_{fp}$ are set to predefined constant values. In some embodiments, $R_f$ is not necessarily used (e.g., $R_f(y_i)$=0 for all $y_i$).

The objective function described above can also be used when including temporal information. For the cases where the result from the previous frame is aligned to the current frame (e.g., using warping, point tracking, or other suitable techniques), the R term can be modified to include the previous result. For example, the R term may replace the bias map that is normally used, or it may be added to the bias map so both are reflected in the bias. This effect can be captured in the $R_f$ term for the case where features from the previous frame are used in the current frame (e.g., where a color was biased towards the foreground in the previous frame, that color may be biased toward foreground in the current frame). For instance, the value of $R_f$ for a given feature can be set using the percentage of pixels with that feature in the previous frame having foreground versus background.

In an embodiment, the objective function described above can be minimized using graph cut. However, it will be understood that in some embodiments, different algorithms, such as belief propagation, can be used to minimize the same objective function.

In one particular embodiment, the input is the current image frame of a camera feed, from which the frames can be continuously updated. The frame includes one or more objects. First, a bias is created for initially determining where the object or objects are located in the frame, where the object or objects are not located, or both. One such bias is a center bias. For example, a rectangle about half the size of the image may be placed in the center of the image. The region of the image frame within the rectangle can be weighted toward the foreground, meaning that the rectangle is a bias toward, or an initial guess of, where the object is located. Similarly, the boundaries of the image (e.g., regions outside of the rectangle) are used as a bias toward the background, or a guess of where the object is not located. Between the forward bias region and the boundaries of the image there may be an intermediate region having no bias; that is, some pixels in the intermediate region may not be biased towards either the foreground or background. The center bias favors selecting an object that is in the center of the frame; however, it will be understood that a different bias may be used. For example, the bias does not need to be a rectangle, but instead can be a Gaussian curve that is centered in the image frame and falls off toward the edges. Another example bias is a face or body bias, where the object is a person. A face detector can used to find a face in the image. The face and area below the face (e.g., the body) is biased toward being in the foreground and the area above and to the sides of the face is biased toward being in the background. Other types of biases will be apparent in light of this disclosure.

Next, the bias is fed into an optimization algorithm for an objective function, such as a graph cut algorithm having a non-localized neighborhood graph structure or a belief propagation algorithm. It will be understood that other optimization algorithms can be used to solve the objective function. In a graph cut, each pixel in the frame is represented by a node in a graph. A data term is used to weight each pixel toward the foreground or background. The bias is used to form the data term. A non-local, color-based neighborhood term is used for assigning the same labels (e.g., foreground or background) to neighboring pixels. This type of neighborhood means that the pixels in the foreground bias region can influence all pixels of the same color in the image to be foreground (e.g., including non-contiguous pixels, such as where several distinct objects appear in the foreground of the frame), and the pixels in the background bias region can influence all pixels of the same color in the image to be background. Features other than, or in addition to, color, can be used. This is in contrast to some prior algorithms in which only pixels immediately surrounding a given pixel are considered neighbors. The graph cut can be optimized to produce an initial binary segmentation of the image, where one segment includes the object (foreground). In some embodiments, the graph cut can be performed on a low resolution version of the image to improve performance; however, it will be understood in light of this disclosure that the graph cut can be performed on other resolutions, including full or high resolutions.

Next, the low resolution result of the graph cut (e.g., the initial image segmentation) is refined at full resolution using a matting algorithm. The matting algorithm can create a soft pixel mask that more accurately models the edges of objects and can capture detail in hair and fur. A soft pixel mask is one in which the pixels are assigned more than one weighted label. For example, instead of all pixels being labeled as purely foreground or background, the pixels can be labeled with some percentage, such as 70% foreground and 30% background. Next, the mask is shown interactively on a display so the user can see the segmentation. The mask may be depicted, for example, using coloring or tinting, texturing, or outlining the target object or set of objects.

In another embodiment, the movement of the camera can be tracked so that the mask obtained using previous frames can be used to inform the mask in the current frame. The movement information can be included in the data term of the graph cut to improve the temporal coherence of the selection. For example, if the user orients the camera toward the object from various angles and positions, over time the mask can be improved using the sequence of frames to segment the image more precisely. In one particular embodiment, information from past frames can be used to affect the segmentation in the current frame. Such temporal information can be used for several purposes. For example, one purpose may include ensuring temporal coherence of the segmentation; for example, to make sure that the segment containing the object does not quickly alternate from the object to the background and back (e.g., by averaging several pixel masks generated from segmentations of several image frames of the live camera feed). The temporal information can also be used to improve the segmentation by locking one part of the segment in place so that the user can move the camera and finish the selection. According to some embodiments, there are several techniques for gathering temporal information. One such technique includes computing a warping or an affine transformation from the previous frame to the current frame. Then, the mask from the previous frame can be transferred to the current frame. This technique is particularly useful for improving temporal coherence of the segmentation while the user is holding the camera fairly still. Another such technique includes point-tracking or region-tracking algorithms for transferring temporal information from one region to another. For example, point tracking methods look for points in the image that are easy to track accurately. These points can act as input to the next frame to indicate that certain pixels should either be part of the foreground of part of the background. Yet another technique for gathering temporal information includes storing a feature distribution of the foreground or background. For example, the algorithm may use color as a feature, and look at the colors of the object, and then use that to influence pixels in later frames with those colors to be part of the object.

Some camera systems, such as those on mobile phones (so-called smartphones) or digital cameras, have sensors (gyroscopes, accelerometers, compasses) that help them detect motion. In these cases, the detected motion of the device can be used to compute an initial alignment of the previous and current frames. This can alone be used to transfer temporal information, or it can be used as a starting point for another algorithm. In some cases, the user may wish to indicate whether temporal information should be used. For example, the user may want to lock all pixels in the current selection and then move the camera a little to get the rest of the pixels. This could be accomplished by pushing a button. If the camera has motion sensors, another way to do it is to detect if the user has not moved the camera for a specified amount of time, and lock any pixels in the selection if true. A visual cue can be displayed to show the user that the current selection is being locked. In such a case, a predefined motion like a rapid movement or a shaking gesture could be used to unlock the selection.

One or more of the techniques for gathering temporal information such as those provided in this disclosure can be used to generate a pixel map showing pixels that are likely to be object or to be background. This can be implemented by replacing the bias, or can be included as an additional bias. Another alternative is that after the selection is computed for the current frame, an object mask generated from the temporal information can be blended into the current mask.

Example System

Figure 1:
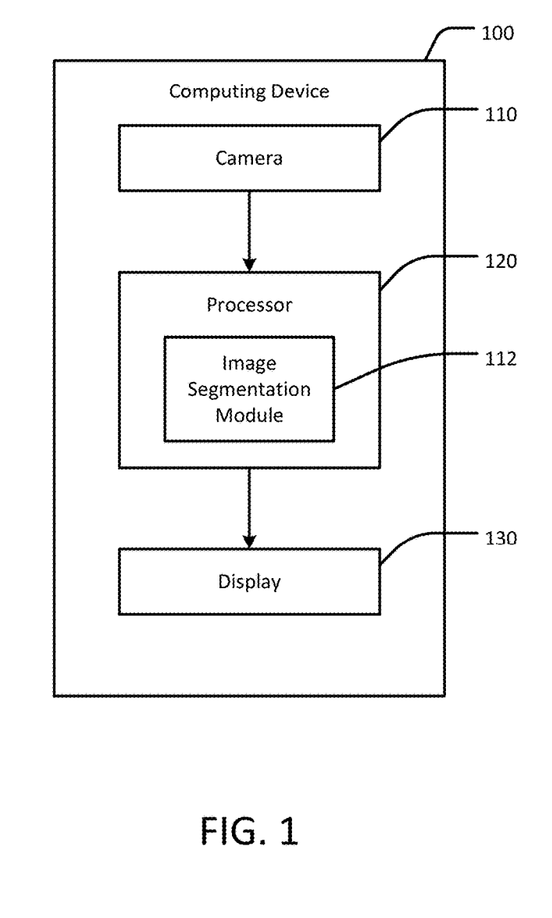
FIG. 1 illustrates an example computing device for segmenting an image frame of a live camera feed, in accordance with an embodiment of the present invention.

FIG. 1 illustrates an example computing device 100 for segmenting an image frame of a live camera feed, in accordance with an embodiment. The device 100 includes a camera 110, a processor 120, and a display 130. Generally, the device 100 can include any type of computing device, such as a personal computer (PC), laptop, tablet, or smartphone. The processor can include an image segmentation module 112 programmed or otherwise configured to process image data, as will be discussed in further detail below. It will be understood that the camera 110, processor 120 and display 130 can be integrated into a single device or into several devices (e.g., the camera 110 may be a separate Universal Serial Bus (USB) camera connected to the computing device 100, or the display 130 may be a standalone computer monitor connected to the computing device 100).

By way of example, the camera 110 can be configured to obtain a plurality of image frames and send each image frame to the processor 120. The image frames may, for example, include one or more objects set against a background. The processor 120 in turn can send one or more of the image frames to the display 130 so that a user can view the images, for example, as a live camera feed. Thus, as the user moves the camera 110 with respect to the objects, the live camera feed on the display 130 can be updated to reflect the changing perspective and field of view of the camera 110. As will be described in further detail below, additional information generated by the processor 120 can be shown on the display 130 in addition to the live camera feed. For example, a mask can be overlaid on the live camera feed to indicate the boundaries of an object in the field of view. Such a mask or object selection can be useful, for example, in editing applications.

Example Use Cases

Figure 2A:
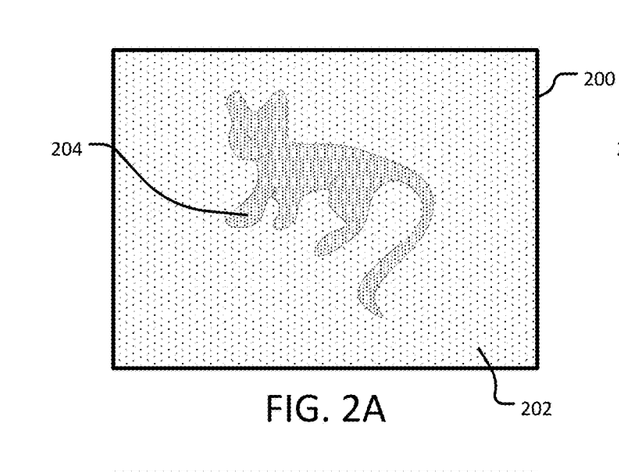
FIGS. 2A-2E depict example image frames, in accordance with various embodiments of the present invention.

FIG. 2A depicts an example image frame 200 in accordance with an embodiment of the present invention. The image frame 200 may, for example, be acquired by the camera 110 of FIG. 1 and represent one frame of a sequence of frames from, for example, a live camera feed. The image frame 200 includes a background bias region 202 and at least one object 204 in the foreground of the image frame. For clarity, the object 204 and background 202 are shown with substantially uniform colors; however, it will be understood in light of this disclosure that either or both the object 204 and background 202 can have varied colors (e.g., due to shading, texture, or other characteristics). Once acquired, the image frame 200 may, for example, be processed by the image segmentation module 112, displayed by the display 130, or both.

Figure 2B:
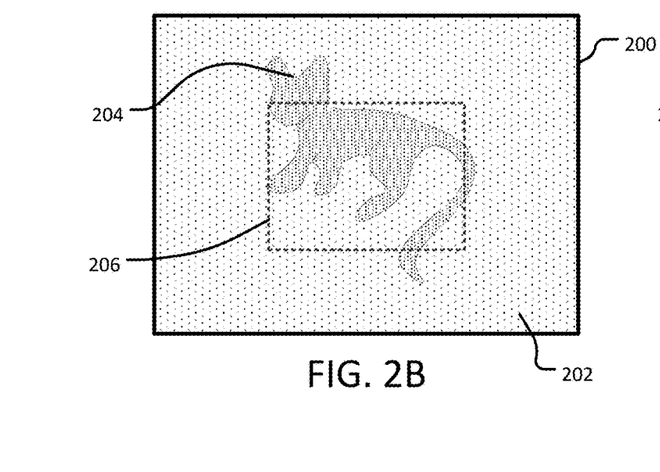

FIG. 2B depicts the example image frame 200 of FIG. 2A, showing an example representation of a bias 206 in accordance with an embodiment of the present invention. As noted above, the region represented by the bias 206 can be an initial guess of the location of the object 204 within the image frame 200, while the region around the boundaries of the image frame 200 can be an initial guess of where the object 204 is not located. The bias 206 can be used as a data term in a graph cut optimization algorithm for identifying the boundaries of foreground objects, such as object 204, in the image frame 200. In FIG. 2B, the bias 206 is represented by a rectangular area centered about the center of the frame 200. The rectangle can be of any size or location within the image frame 200. As noted above, the bias 206 does not necessarily need to be represented by a rectangular area. For example, the bias may be represented by any polygon or Gaussian curve. However, when the object 204 is generally located at or near the center of the image frame 200, a rectangular bias can be sufficient for use in the graph cut algorithm.

As will be described in further detail below, one or more pixels within the foreground bias region (e.g., pixels inside of the bias 206), and one or more pixels outside of the foreground bias region, can be used as constraints for segmenting the object 204 from the background 202 using a suitable image segmentation algorithm, such as a graph cut optimization algorithm or a belief propagation algorithm, for solving an objective function. For example, in a graph cut optimization algorithm, each pixel in the image frame 200 can be represented by a node in a graph. Nodes corresponding to pixels in the object 204 can be weighted to the foreground, and nodes corresponding to pixels in the background 202 are weighted to the background. For all possible binary segmentations of the graph, the segmentation according to a minimum cost function can be used to determine which nodes, and thus which pixels, are members of the foreground segment and which nodes are members of the background segment. In some embodiments, the amount of memory used by the processor 120 to perform the graph cut optimization algorithm can be reduced by performing the graph cut on a low resolution version of the image frame 200.

Figure 2C:
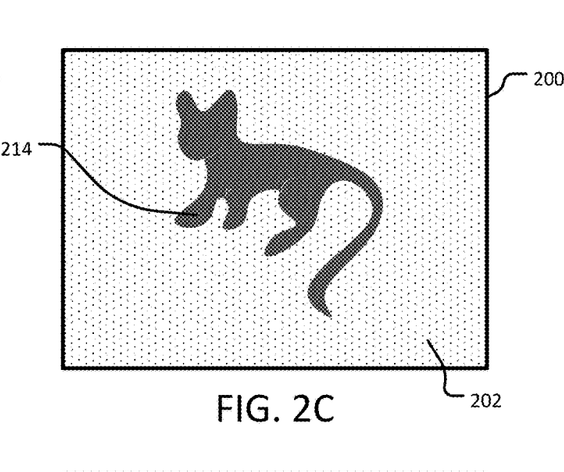
Figure 2D:
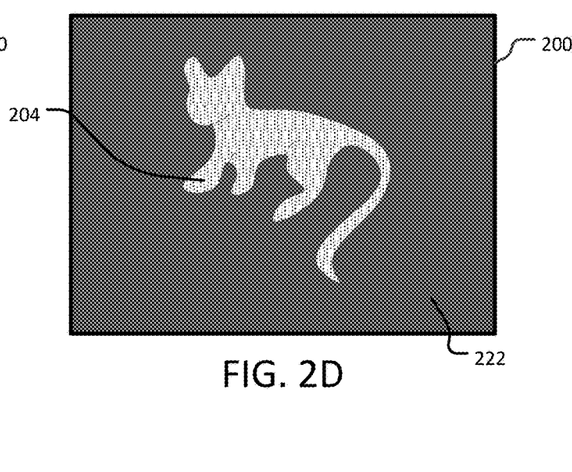

Once the boundaries of the object 204 are determined according to the segmentation, a matting algorithm can be used to more accurately model the edges of the object 202, particularly where such edges have an irregular or complex shape. The result of the matting algorithm is a mask that can be superimposed over either the object 204 or the background 202 to visually indicate the boundaries of the object 204. FIG. 2C depicts the image frame 200 of FIG. 2A with a mask 214 superimposed over the object 204. FIG. 2D alternatively depicts the image frame 200 of FIG. 2A with a mask 222 superimposed over the background 202. The image frame 200 and the superimposed mask 214 or 222 can be displayed via the display 130 of FIG. 1.

Figure 2E:
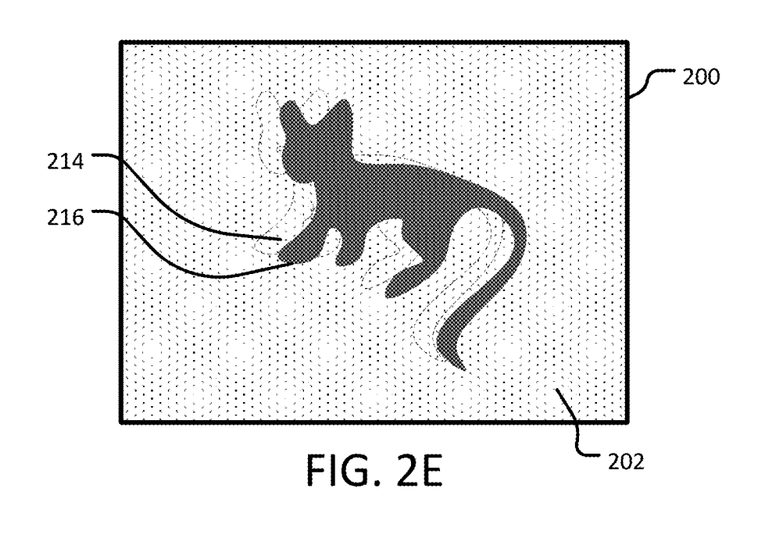

In some embodiments, the image frame 200 updates with time as the live camera feed progresses. For instance, if the user moves the camera 110, the image frame 200 changes as the position of the camera 110 changes. In such cases, the boundaries of the object 204 and the mask 214, 222 are updated to correspond with the changed position of the object 204 in relation to the background 202 within the updated image frame 200, such as shown in FIG. 2E. In FIG. 2E, for example, the prior location of the object 204 and corresponding mask 214 in FIG. 2C is depicted as a phantom dashed line (which may not actually be displayed to the user), and the updated location of the mask is indicated at 216. In some embodiments, the mask in previous image frames (e.g., those occurring prior to the update) can be used to inform the matting algorithm for updating the mask 214, 222. For example, the mask may be included in the data term for the graph cut optimization algorithm discussed above to improve the temporal coherence of the image segmentation as the object 204 changes locations within successive image frames (e.g., the location of the mask 214, 222 changes contemporaneously with changes in location of the object 204 in the updated image frame).

Example Methodology

Figure 3:
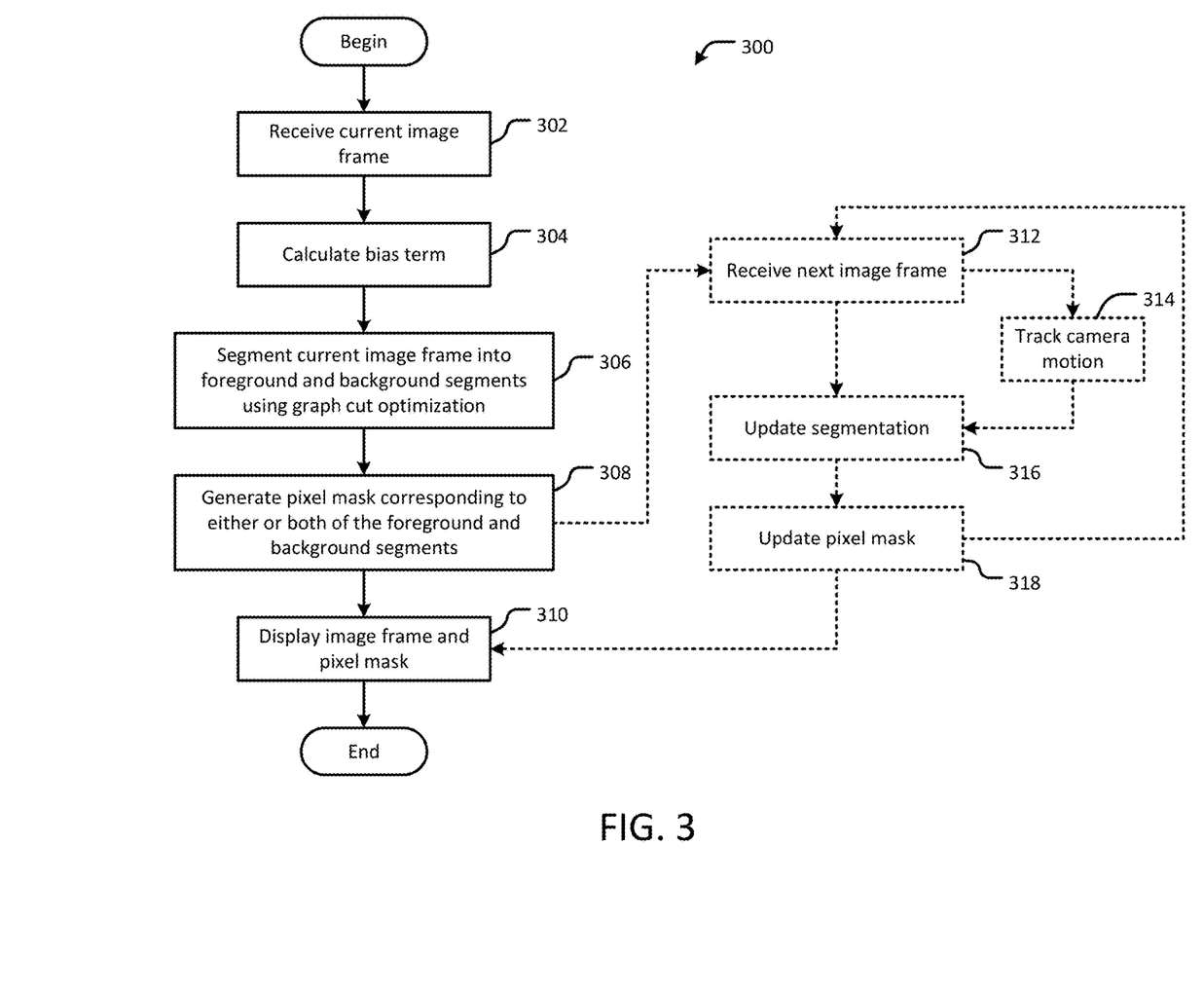
FIG. 3 is a flow diagram representative of an example methodology for segmenting an image frame of a live camera feed, in accordance with an embodiment of the present invention.

FIG. 3 is a flow diagram of an example methodology 300 for segmenting an image frame of a live camera feed, in accordance with an embodiment. The example methodology 300 may, for example, be implemented by the image segmentation module 112 of FIG. 1. The method 300 begins by receiving 302 a current image frame (e.g., the image frame 200 of FIG. 2A). The current image frame may, for example, be acquired by a camera (e.g., the camera 110 of FIG. 1). The current image frame includes a foreground bias region (e.g., corresponding to an object in the image frame) and a background bias region. In some embodiments, there can be more than one foreground bias region (e.g., the right side of the image may be biased to a first object, the left side of the image may be biased to a second object, and the borders of the image may be biased to the background). The method 300 continues by calculating 304 a bias term. The bias term may, for example, represent a rectangular region centered about the center of the current image frame, or any other region of the current image frame. The method 300 continues by segmenting 306 the current image frame into a foreground segment and a background segment using a graph cut optimization technique based on the bias term. The segmentation designates each pixel in the current image frame as being a foreground pixel or a background pixel. The foreground pixels can be, but do not necessarily have to be, neighboring or contiguous pixels. Likewise, the background pixels can be, but do not necessarily have to be, neighboring or contiguous pixels. Thus, the foreground and background segments can each include several discontinuous groups (segments) of pixels.

In some embodiments, the segmentation can be based on a non-local color-based neighborhood, in which pixels having a first color in the foreground bias region can influence some or all pixels in the image that have the same first color, or a similar color, to be in the foreground segment, and pixels having a second color in the background bias region can influence some or all pixels that have the same second color, or a similar color, in the image to be in the background segment.

The method 300 continues by generating 308 a pixel mask corresponding to the foreground segment, the background segment, or a combination of both segments. As discussed above with respect to FIGS. 2C and 2D, the pixel mask can correspond to the foreground of the current image frame or the background of the current image frame. The method 300 continues by displaying 310 the image frame and the pixel mask (e.g., via the display 130 of FIG. 1). The pixel mask may, for example, be superimposed over either the foreground or the background of the current image frame, respectfully.

In some embodiments, the method continues by receiving 312 a different image frame in a sequence of image frames, such as found in a live camera feed. In some embodiments, the method continues by tracking 314 the motion of the camera. For example, if the perspective of the camera changes over time, the location of an object in the foreground may change relative to the image frame. The method continues by updating 316 the segmentation of the foreground and background segments to reflect the changes in locations of the foreground and background in the different image frame. The method continues by updating 318 the pixel mask based on the updated segmentation. The updated pixel mask may then be displayed 310, as described above.

In some embodiments, markers can be placed on the display to help the user select the desired object. For example, a crosshairs or dot can be displayed, and the pixels under that marker can be used as part of the selection, providing a visual guide to the user. In some cases, the markers can be used to improve the selection. For example, for any points under the marker, a high-weighted link can be added to the graph in the graph cut optimization algorithm to weight those pixels to the foreground. This can influence the neighboring pixels to also be weighted to the foreground. Another type of marker includes a box or ellipse inside which the desired object is located. In this case, any pixels outside the box/ellipse can be weighted to the background.

Example Computing Device

Figure 4:
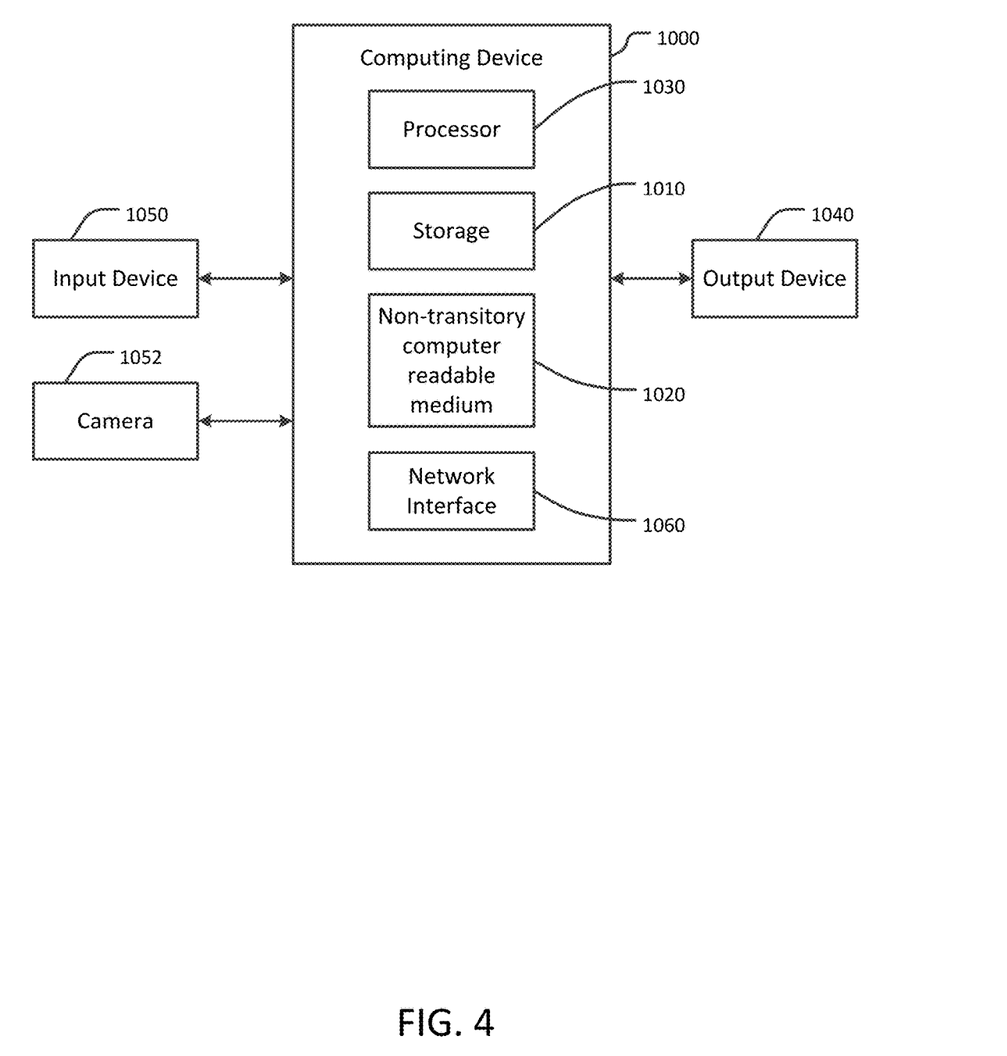
FIG. 4 is a block diagram representing an example computing system that may be used in accordance with an embodiment of the present invention.

FIG. 4 is a block diagram representing an example computing device 1000 that may be used to perform any of the techniques as variously described in this disclosure. For example, the computing device 100, the camera 110, the processor 120, the display 130, the image segmentation module, or any combination of these may be implemented in the computing device 1000. The computing device 1000 may be any computer system, such as a workstation, desktop computer, server, laptop, handheld computer, tablet computer (e.g., the iPad™ tablet computer), mobile computing or communication device (e.g., the iPhone™ mobile communication device, the Android™ mobile communication device, and the like), or other form of computing or telecommunications device that is capable of communication and that has sufficient processor power and memory capacity to perform the operations described in this disclosure. A distributed computational system may be provided comprising a plurality of such computing devices.

The computing device 1000 includes one or more storage devices 1010 and/or non-transitory computer-readable media 1020 having encoded thereon one or more computer-executable instructions or software for implementing techniques as variously described in this disclosure. The storage devices 1010 may include a computer system memory or random access memory, such as a durable disk storage (which may include any suitable optical or magnetic durable storage device, e.g., RAM, ROM, Flash, USB drive, or other semiconductor-based storage medium), a hard-drive, CD-ROM, or other computer readable media, for storing data and computer-readable instructions and/or software that implement various embodiments as taught in this disclosure. The storage device 1010 may include other types of memory as well, or combinations thereof. The storage device 1010 may be provided on the computing device 1000 or provided separately or remotely from the computing device 1000. The non-transitory computer-readable media 1020 may include, but are not limited to, one or more types of hardware memory, non-transitory tangible media (for example, one or more magnetic storage disks, one or more optical disks, one or more USB flash drives), and the like. The non-transitory computer-readable media 1020 included in the computing device 1000 may store computer-readable and computer-executable instructions or software for implementing various embodiments. The computer-readable media 1020 may be provided on the computing device 1000 or provided separately or remotely from the computing device 1000.

The computing device 1000 also includes at least one processor 1030 for executing computer-readable and computer-executable instructions or software stored in the storage device 1010 and/or non-transitory computer-readable media 1020 and other programs for controlling system hardware. Virtualization may be employed in the computing device 1000 so that infrastructure and resources in the computing device 1000 may be shared dynamically. For example, a virtual machine may be provided to handle a process running on multiple processors so that the process appears to be using only one computing resource rather than multiple computing resources. Multiple virtual machines may also be used with one processor.

A user may interact with the computing device 1000 through an output device 1040, such as a screen or monitor (e.g., the display 130 of FIG. 1), which may display one or more user interfaces provided in accordance with some embodiments. The output device 1040 may also display other aspects, elements and/or information or data associated with some embodiments. The computing device 1000 may include other I/O devices 1050 for receiving input from a user, for example, a keyboard, a joystick, a game controller, a pointing device (e.g., a mouse, a user's finger interfacing directly with a display device, etc.), or any suitable user interface. The computing device 1000 may include other suitable conventional I/O peripherals, such as a camera 1052. The computing device 1000 can include and/or be operatively coupled to various suitable devices for performing one or more of the functions as variously described in this disclosure.

The computing device 1000 may run any operating system, such as any of the versions of Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device 1000 and performing the operations described in this disclosure. In an embodiment, the operating system may be run on one or more cloud machine instances.

In other embodiments, the functional components/modules may be implemented with hardware, such as gate level logic (e.g., FPGA) or a purpose-built semiconductor (e.g., ASIC). Still other embodiments may be implemented with a microcontroller having a number of input/output ports for receiving and outputting data, and a number of embedded routines for carrying out the functionality described in this disclosure. In a more general sense, any suitable combination of hardware, software, and firmware can be used, as will be apparent.

As will be appreciated in light of this disclosure, the various modules and components of the system shown in FIG. 1, such as the image segmentation module 112, can be implemented in software, such as a set of instructions (e.g., C, C++, object-oriented C, JavaScript, Java, BASIC, etc.) encoded on any computer readable medium or computer program product (e.g., hard drive, server, disc, or other suitable non-transient memory or set of memories), that when executed by one or more processors, cause the various methodologies provided in this disclosure to be carried out. It will be appreciated that, in some embodiments, various functions performed by the user computing system, as described in this disclosure, can be performed by similar processors and/or databases in different configurations and arrangements, and that the depicted embodiments are not intended to be limiting. Various components of this example embodiment, including the computing device 100, can be integrated into, for example, one or more desktop or laptop computers, workstations, tablets, smartphones, game consoles, set-top boxes, or other such computing devices. Other componentry and modules typical of a computing system, such as processors (e.g., central processing unit and co-processor, graphics processor, etc.), input devices (e.g., keyboard, mouse, touch pad, touch screen, etc.), and operating system, are not shown but will be readily apparent.

Example Applications

Embodiments of the present invention can be applied to one or more applications. In one example application, an object can be extracted from an image so that the object can be traced into line art. In another example application, live foreground/background edits can be displayed to a user on a tablet or other mobile device. For instance, such an application can allow the user to see the foreground/background effects (e.g., the mask 214 or 222 of FIGS. 2C and 2D) in a camera preview screen before a picture is taken (e.g., in real-time or near real-time). Examples of such effects include 1) tinting the foreground red; 2) showing the foreground in white and the background in black; 3) showing the foreground on a different, checkered background; 4) increasing the saturation of the foreground and decreasing the saturation of the background; and 5) showing the foreground in color and the background as a line drawing. Note that the user can move the tablet or mobile device around and see the effect in a live image preview. As will be appreciated in light of this disclosure, other effects can be used.

Another example application can be used for live image composition. If a user wants to create a self-portrait or so-called "selfie" image without turning their back to the scene, the user takes a photo of the scene with the mobile device's back-facing camera, and then the application switches to the front-facing camera automatically, selects the person, and composites them live into the background (e.g., using a face/person bias). If the device allows the front and back cameras to both be active at the same time, then the scene from the back camera can be live as well.

Numerous embodiments will be apparent in light of the present disclosure, and features described in this disclosure can be combined in any number of configurations. One example embodiment provides a system including a storage having at least one memory, and one or more processors each operatively coupled to the storage. The one or more processors are configured to carry out a process including receiving current frame pixel data representing a current image frame; calculating a bias term representing a weighting of each pixel in the current image frame towards one of a foreground bias region and a background bias region; segmenting, using an energy optimization function (e.g., with a graph cut optimization technique or a belief propagation algorithm), the current image frame into a foreground segment and a background segment based on the pixel data and the bias term; and generating a pixel mask corresponding to pixels in at least one of the foreground segment and the background segment. In some cases, the system includes a display operatively coupled to the processor and configured to provide a graphical user interface, where the process includes displaying, via the graphical user interface, the current image frame and the pixel mask such that the pixel mask is superimposed over the respective pixels in the image frame. In some cases, the segmentation is further based on a first feature (e.g., a color) of a first pixel in the foreground bias region and a second feature (e.g., another color) of a second pixel in the background bias region, and where a third pixel in the current image frame having the first feature is segmented into the foreground segment and a fourth pixel in the current image frame having the second feature is segmented into the background segment. In some cases, the foreground bias region includes a center of the current image frame, a face of a person detected in the current image frame, or a body of a person detected in the current image frame. In some cases, the current image frame is one of a plurality of image frames in a live camera feed, where the process includes receiving additional pixel frame data representing a different image frame, and using the graph cut optimization technique to update the segmentation of the current image frame based on the additional pixel data. In some such cases, the process includes updating the pixel mask based on the updated segmentation. In some such cases, the process includes updating the pixel mask based on at least one pixel mask generated prior to receiving one of the continuously updated image frames. In some such cases, the updating includes generating a new pixel mask corresponding to at least one of the foreground segment and the background segment in the different image frame, and averaging the new pixel mask with the at least one prior pixel mask thereby producing an updated pixel mask. In some cases, the process includes sequentially displaying, via the graphical user interface, each of the updated pixel masks. Another embodiment provides a non-transient computer-readable medium or computer program product having instructions encoded thereon that when executed by one or more processors cause the processor to perform one or more of the functions defined in the present disclosure, such as the methodologies variously described in this paragraph. In some cases, some or all of the functions variously described in this paragraph can be performed in any order and at any time by one or more different processors.

The foregoing description and drawings of various embodiments are presented by way of example only. These examples are not intended to be exhaustive or to limit the invention to the precise forms disclosed. Alterations, modifications, and variations will be apparent in light of this disclosure and are intended to be within the scope of the invention as set forth in the claims.

What is claimed is:

1. A computer-implemented digital image processing method comprising: receiving pixel data representing a current image frame, the pixel data including a pixel location within the current image frame and color channel information for each pixel in the current image frame; calculating a bias term representing a weighting of each pixel in the current image frame towards one of a foreground bias region and a background bias region based on the pixel location relative to each of the foreground bias region and the background bias region; automatically assigning a pixel label to each pixel in the current image frame, each pixel label representing one of a foreground pixel and a background pixel; automatically associating a feature cluster with each pixel in the current image frame having a particular color based on the color channel information, the feature cluster representing a non-local, color-based neighborhood of all pixels in the current image frame having the particular color; segmenting, by a processor using an energy optimization function, the current image frame into a foreground segment and a background segment based on the pixel data, the feature cluster, and the bias term such that all of the pixels in the current image frame having the particular color are in one of the foreground segment and the background segment, wherein the current image frame is segmented by optimizing an objective function, the objective function including all of the pixel labels in the current image frame combined with all of the feature clusters in the current image frame; generating a pixel mask corresponding to pixels in at least one of the foreground segment and the background segment; and displaying, via a graphical user interface, the current image frame and the pixel mask such that the pixel mask is superimposed over the respective pixels in the image frame.

2. The method of claim 1, wherein the segmentation is further based on a first feature of a first pixel in the foreground bias region and a second feature of a second pixel in the background bias region, and wherein a third pixel in the current image frame having the first feature is weighted towards the foreground segment and a fourth pixel in the current image frame having the second feature is weighted towards the background segment.

3. The method of claim 1, wherein the foreground bias region includes at least one of a center of the current image frame, a face of a person detected in the current image frame, and a body of a person detected in the current image frame.

4. The method of claim 1, wherein the current image frame is one of a plurality of image frames in a live camera feed, and wherein the method further comprises:
receiving additional pixel frame data representing a different image frame; and
using the energy optimization function to update the segmentation of the current image frame based on the additional pixel data.

5. The method of claim 4, further comprising updating the pixel mask based on at least one pixel mask generated prior to receiving one of the continuously updated image frames.

6. The method of claim 5, wherein the updating includes:
generating a new pixel mask corresponding to at least one of the foreground segment and the background segment in the different image frame; and
averaging the new pixel mask with the at least one prior pixel mask thereby producing an updated pixel mask.

7. The method of claim 1, wherein the segmentation is performed using one of a graph cut optimization algorithm and a belief propagation algorithm.

8. The method of claim 5, further comprising sequentially displaying, via the graphical user interface, each of the updated pixel masks.

9. A system comprising: a storage; a processor operatively coupled to the storage, the processor configured to execute instructions stored in the storage that when executed cause the processor to carry out a process comprising: receiving current frame pixel data representing a current image frame, the pixel data including a pixel location within the current image frame and color channel information for each pixel in the current image frame; calculating a bias term representing a weighting of each pixel in the current image frame towards one of a foreground bias region and a background bias region based on the pixel location relative to each of the foreground bias region and the background bias region; automatically assigning a pixel label to each pixel in the current image frame, each pixel label representing one of a foreground pixel and a background pixel; automatically associating a feature cluster with each pixel in the current image frame having a particular color based on the color channel information, the feature cluster representing a non-local, color-based neighborhood of all pixels in the current image frame having the particular color; segmenting, using an energy optimization function, the current image frame into a foreground segment and a background segment based on the pixel data, the feature cluster, and the bias term such that all of the pixels in the current image frame having the particular color are in one of the foreground segment and the background segment, wherein the current image frame is segmented by optimizing an objective function, the objective function including all of the pixel labels in the current image frame combined with all of the feature clusters in the current image frame; generating a pixel mask corresponding to pixels in at least one of the foreground segment and the background segment; and a display operatively coupled to the processor and configured to provide a graphical user interface, wherein the process further comprises: displaying, via the graphical user interface, the current image frame and the pixel mask such that the pixel mask is superimposed over the respective pixels in the image frame.

10. The system of claim 9, wherein the segmentation is further based on a first feature of a first pixel in the foreground bias region and a second feature of a second pixel in the background bias region, and wherein a third pixel in the current image frame having the first feature is weighted towards the foreground segment and a fourth pixel in the current image frame having the second feature is weighted towards the background segment.

11. The system of claim 9, wherein the foreground bias region includes at least one of a center of the current image frame, a face of a person detected in the current image frame, and a body of a person detected in the current image frame.

12. The system of claim 9, wherein the current image frame is one of a plurality of image frames in a live camera feed, and wherein the process further comprises:
receiving additional pixel frame data representing a different image frame; and using the energy optimization function to update the segmentation of the current image frame based on the additional pixel data.

13. The system of claim 12, wherein the process further comprises updating the pixel mask based on at least one pixel mask generated prior to receiving one of the continuously updated image frames.

14. The system of claim 13, wherein the updating includes:
generating a new pixel mask corresponding to at least one of the foreground segment and the background segment in the different image frame; and
averaging the new pixel mask with the at least one prior pixel mask thereby producing an updated pixel mask.

15. The system of claim 9, wherein the segmentation is performed using one of a graph cut optimization algorithm and a belief propagation algorithm.

16. The system of claim 13, wherein the process further comprises sequentially displaying, via the graphical user interface, each of the updated pixel masks.

17. A non-transitory computer program product having instructions encoded thereon that when executed by one or more processors cause a process to be carried out, the process comprising: receiving current frame pixel data representing a current image frame, the pixel data including a pixel location within the current image frame and color channel information for each pixel in the current image frame; calculating a bias term representing a weighting of each pixel in the current image frame towards one of a foreground bias region and a background bias region based on the pixel location relative to each of the foreground bias region and the background bias region; automatically assigning a pixel label to each pixel in the current image frame, each pixel label representing one of a foreground pixel and a background pixel; automatically associating a feature cluster with each pixel in the current image frame having a particular color based on the color channel information, the feature cluster representing a non-local, color-based neighborhood of all pixels in the current image frame having the particular color; segmenting, using an energy optimization function, the current image frame into a foreground segment and a background segment based on the pixel data, the feature cluster, and the bias term such that all of the pixels in the current image frame having the particular color are in one of the foreground segment and the background segment, wherein the current image frame is segmented by optimizing an objective function, the objective function including all of the pixel labels in the current image frame combined with all of the feature clusters in the current image frame; generating a pixel mask corresponding to pixels in at least one of the foreground segment and the background segment; and displaying, via a graphical user interface, the current image frame and the pixel mask such that the pixel mask is superimposed over the respective pixels in the image frame.

* * * * *